(12) United States Patent
Mathea et al.

(10) Patent No.: US 11,565,461 B2
(45) Date of Patent: Jan. 31, 2023

(54) METHOD AND DEVICE FOR PRODUCING A THREE-DIMENSIONAL SHAPED OBJECT BY MEANS OF LAYER-BY-LAYER MATERIAL APPLICATION

(71) Applicants: dp polar GmbH, Eggenstein-Leopoldshafen (DE); ALTANA AG, Wesel (DE)

(72) Inventors: Hans Mathea, Eggenstein-Leopoldshafen (DE); Martin Bohn, Reutlingen (DE)

(73) Assignees: dp polar GmbH, Eggenstein-Leopoldshafe (DE); ALTANA AG, Wesel (DE)

( * ) Notice: Subject to any disclaimer, the term of this patent is extended or adjusted under 35 U.S.C. 154(b) by 398 days.

(21) Appl. No.: 16/484,969

(22) PCT Filed: Feb. 9, 2018

(86) PCT No.: PCT/EP2018/053365
§ 371 (c)(1),
(2) Date: Sep. 25, 2019

(87) PCT Pub. No.: WO2018/146287
PCT Pub. Date: Aug. 16, 2018

(65) Prior Publication Data
US 2020/0016819 A1 Jan. 16, 2020

(30) Foreign Application Priority Data
Feb. 11, 2017 (DE) .................. 10 2017 001 276.8

(51) Int. Cl.
*B29C 64/112* (2017.01)
*B29C 64/209* (2017.01)
(Continued)

(52) U.S. Cl.
CPC ............ *B29C 64/112* (2017.08); *B29C 64/10* (2017.08); *B29C 64/209* (2017.08);
(Continued)

(58) Field of Classification Search
CPC ... B29C 64/112; B29C 64/124; B29C 64/209; B29C 64/218
See application file for complete search history.

(56) References Cited

U.S. PATENT DOCUMENTS 6,206,672 B1   3/2001 Grenda
9,002,496 B2 * 4/2015 Elsey .................... B29C 64/182
                                                              425/375
(Continued)

FOREIGN PATENT DOCUMENTS

DE          2052038 A1      4/1972
DE    102016111047 B3  * 10/2017    ............... B21H 1/06
JP         10149588 A   *  6/1998

*Primary Examiner* — Atul P. Khare
(74) *Attorney, Agent, or Firm* — The Webb Law Firm

(57) ABSTRACT

The invention relates to a method for producing a three-dimensional shaped object without height limitation by means of layer-by-layer material application, wherein geometric data for the shaped object, a substrate part having a base surface for holding the shaped object, flowable first and second material, and a transfer body are provided. Material portions of the flowable first material are applied to the base surface and/or to a solidified material layer of the three-dimensional shaped object located on the base surface in accordance with the geometric data in order to produce a material layer of the three-dimensional shaped object. The material layer consisting of the first material is solidified. A surface region of the transfer body is coated with a layer of the second material, and said layer is brought into contact with the surface of the topmost solidified material layer of the three-dimensional shaped object facing away from the base surface in such a way that the flowable second material
(Continued)

is transferred from the transfer body to the surface of the topmost solidified material layer of the three-dimensional shaped object and forms the further material layer on the surface of the topmost solidified material layer of the three-dimensional shaped object, the structure of which further layer corresponds to the structure of the topmost solidified material layer of the three-dimensional shaped object. The further material layer is likewise solidified.

12 Claims, 8 Drawing Sheets

(51) Int. Cl.
| | |
|---|---|
| *B29C 64/264* | (2017.01) |
| *B29C 64/245* | (2017.01) |
| *B29C 64/255* | (2017.01) |
| *B29C 64/393* | (2017.01) |
| *B29C 64/10* | (2017.01) |
| *B29C 64/218* | (2017.01) |
| *B33Y 70/00* | (2020.01) |
| *B33Y 10/00* | (2015.01) |
| *B33Y 30/00* | (2015.01) |
| *B33Y 40/00* | (2020.01) |
| *B33Y 50/02* | (2015.01) |

(52) U.S. Cl.
CPC .......... *B29C 64/218* (2017.08); *B29C 64/245* (2017.08); *B29C 64/255* (2017.08); *B29C 64/264* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 9,592,635 B2* | 3/2017 | Ebert | B29C 41/042 |
| 10,220,570 B2* | 3/2019 | Okamoto | B29C 64/129 |
| 10,226,894 B2* | 3/2019 | Houben | B29C 64/176 |
| 10,272,618 B2* | 4/2019 | Hays | B29C 64/194 |
| 10,850,325 B2* | 12/2020 | Taniuchi | B33Y 10/00 |
| 11,220,047 B2* | 1/2022 | Ohara | B29C 64/20 |
| 2002/0119584 A1 | 8/2002 | Duthaler et al. | |
| 2015/0024169 A1 | 1/2015 | Martin | |
| 2015/0266241 A1 | 9/2015 | Batchelder | |
| 2017/0100898 A1* | 4/2017 | Cofler | B29C 64/176 |
| 2019/0022937 A1* | 1/2019 | Stelter | B29C 64/218 |

* cited by examiner

METHOD AND DEVICE FOR PRODUCING A THREE-DIMENSIONAL SHAPED OBJECT BY MEANS OF LAYER-BY-LAYER MATERIAL APPLICATION

CROSS-REFERENCE TO RELATED APPLICATIONS

This application is the United States national phase of International Application No. PCT/EP2018/053365 filed Feb. 9, 2018, and claims priority to German Patent Application No. 10 2017 001 276.8 filed Feb. 11, 2017, the disclosures of which are hereby incorporated by reference in their entirety.

BACKGROUND OF THE INVENTION

The invention relates to a method for producing a three-dimensional shaped object by means of layer-by-layer material application, wherein geometric data for the shaped object, a substrate part having a base surface for holding the three-dimensional shaped object, as well as at least one flowable first material and at least one flowable second material, different from the first, are provided, wherein material portions of the at least one flowable first material are applied to the base surface and/or to a solidified material layer of the three-dimensional shaped object located on it, in accordance with the geometric data, so as to produce at least one material layer of the three-dimensional shaped object, and wherein the at least one material layer composed of the at least one flowable first material and at least one further material layer composed of the at least one flowable second material are solidified. Furthermore, the invention relates to a device for producing a three-dimensional shaped object by means of layer-by-layer material application, having a substrate part having a base surface for holding the shaped object, having at least one first reservoir for holding at least one flowable first material and a second reservoir for holding at least one flowable second material that differs from the first flowable material, having at least one dispensing mechanism connected with the at least one first reservoir, for dispensing material portions of the at least one first material onto the base surface and/or onto a solidified material layer of the three-dimensional shaped object located on it, having a first positioning mechanism, by means of which the substrate part and the dispensing mechanism for applying the material portions onto the base surface and/or the solidified material layer can be movably positioned relative to one another, wherein the dispensing mechanism and the first positioning mechanism are connected with a control mechanism, which has a data memory for storing geometric data of the shaped object to be produced, wherein dispensing of the material portions and the positioning mechanism can be controlled by the control mechanism as a function of the geometric data, in such a manner that at least one material layer of the three-dimensional shaped object, composed of the at least one first material, can be applied to the base surface and/or to the solidified material layer of the three-dimensional shaped object located on it, and having at least one fixation mechanism for solidifying the at least one material layer composed of the at least one flowable first material and for solidifying at least one further material layer composed of the flowable second material. In particular, a material portion is understood to be a material droplet.

Such a device is commercially available under the designation Stratasys® Objet30 Pro. The device has a holder, on which a substrate part having an approximately rectangular base surface is located, which extends in a horizontal plane. On the base surface, the three-dimensional shaped object to be produced can be applied by means of applying a plurality of material layers layered one on top of the other, layer by layer.

Above the base surface, multiple print heads are disposed on the holder, which have nozzles disposed in a row, next to one another, in each instance, from which material portions of a flowable material can be dispensed onto the base surface or onto a solidified material layer of the three-dimensional shaped object located on it. The rows with the nozzles are arranged parallel to the two short edges of the rectangular base surface, and can be displaced by means of a positioning mechanism, parallel to the two long edges of the rectangular base surface. Using the positioning mechanism, the substrate part having the base surface can furthermore be moved toward and away from the print heads.

The nozzles of a first print head are connected with a first reservoir, which is filled with a low-viscosity first polymer. The nozzles of a second print head are connected with a second reservoir, which is filled with a low-viscosity second polymer that differs from the first polymer. The polymers can have different colors or different mechanical or chemical properties, for example. In the matter of strength after hardening, however, they always remain in the lower range that is restricted by the low-viscosity materials. Using the print head, it is possible to apply material layers that consist of the different polymers and/or a mixture of these polymers. Thus, it is possible, for example, that each print head dispenses 50% of the material amount to be applied, in each instance, so that the polymers of the first and second reservoir mix with one another in a ratio of 50:50 when they are applied.

Adjacent to the print heads, a fixation mechanism is disposed, which has an ultraviolet radiation source for crosslinking or solidification of the material layers applied using the print heads. The fixation mechanism can be moved relative to the base surface, together with the print heads.

The positioning mechanisms and the print head are connected with a control mechanism, which controls the positioning mechanisms and the material dispensing of the print head in such a manner that the shaped object can be produced by means of layer-by-layer material application.

To produce a shaped object, the print heads are positioned adjacent to a first edge of the substrate, at a predetermined distance above it. Data for the geometry of a first material layer are loaded into a fast print buffer from a data memory in which geometric data for the shaped object to be produced are stored. Afterward, the print heads are continuously moved, using the first positioning mechanism, toward the opposite second edge of the substrate. At the same time, at least one material portion is dispensed onto the substrate, by means of appropriate control of the individual nozzles of the print heads at the locations where a first material layer of the shaped object is to be formed, in each instance. Control of the individual nozzles takes place as a function of the current position of the respective print head and as a function of the data contained in the print buffer. The flowable polymer material applied to the substrate in this manner is solidified by means of irradiation with ultraviolet radiation, which is produced using the fixation mechanism. When the print head has arrived at the second edge of the substrate, the horizontal advancing movement of the print head is stopped, and geometric data for a further material layer to be applied to the material layer previously produced are loaded from the data memory into the print buffer. Furthermore, the substrate part, together with the base surface, is lowered by a dimension that corresponds to the thickness of the previously produced material layer, so as to apply a further material layer onto this material layer. Now the print heads are continuously moved toward the first edge of the substrate, using the positioning mechanism. At the same time, at least one material portion is dispensed onto the material that has already been completed and solidified, in each instance, by means of corresponding control of the nozzles at the locations where the further material layer is to be formed. Once again, the flowable polymer material applied to the substrate in this manner is solidified by means of irradiation with ultraviolet radiation, which is produced using the fixation mechanism.

The method steps mentioned above are repeated in a corresponding manner, until the shaped object has been finished.

Since, in the case of the previously known device, the nozzles by means of which the flowable material is applied have small nozzle cross-sections, so as to allow a correspondingly high resolution, the flowable materials must have a correspondingly low viscosity, so that they can be ejected from the nozzles. Usually, this viscosity amounts to about 5 to 25 MPa·s. The polymer chains contained in the flowable materials must therefore be correspondingly short. However, this has the disadvantage that the shaped objects, which are produced layer by layer, have only a comparatively low mechanical strength. Also, it is only possible with limitations to influence other properties of the shaped objects produced layer by layer, by means of the selection of the materials used for printing. Furthermore, it is disadvantageous that the layer-by-layer production of the shaped objects is time-consuming.

The task therefore exists of creating a method and a device of the type stated initially, which allow fast production of a shaped object. Furthermore, the method and a device are supposed to make it possible to adjust the physical and/or chemical properties within a broad range, by means of corresponding selection of the flowable materials used for producing the material layers. In particular, it should also be possible to produce shaped objects, using the method and the device, which objects contain high-viscosity polymers or polymers that cannot be digitally imprinted or applied.

SUMMARY OF THE INVENTION

According to the invention, this task is accomplished, with regard to a method, whereby at least one transfer body is provided, a surface region of the transfer body is coated with a layer of the flowable second material, and this layer is brought into contact with the surface, facing away from the base surface, of the topmost solidified material layer of the three-dimensional shaped object. The flowable second material is transferred from the transfer body onto the surface of the topmost solidified material layer of the three-dimensional shaped object and forms the further material layer, the structure of which corresponds, at least in certain regions, to that of the topmost solidified material layer of the three-dimensional shaped object. The surface of the further material layer is preferably arranged at a constant distance from the base surface, and the further material layer is solidified.

This is therefore a hybrid method, in which first, the first material layer is "digitally" structured and solidified by means of application of material portions at the locations where a first material layer of the shaped object is supposed to be, and afterward, at least one further material layer is applied onto the first material layer, using an "analog" contact printing method. The second material for the further material layer is arranged on the base surface or on the solidified material layer located on it in such a manner that the entire surface of the further material layer that faces away from the base surface and is to be imprinted is disposed at a constant distance from the base surface at every position. In the case of a level base surface, the surface of the further material layer therefore runs in a plane that is parallel to the plane of the base surface and at a distance from it. In the case of a cylindrical base surface, the surface of the further material layer facing away from the base surface lies in a cylinder surface concentric to the base surface. In the case of the "analog" contact printing method, first a layer of the flowable second material is produced on the transfer body, and then material is transferred to the first material layer at those regions of this layer that correspond to the first material layer. Therefore the structure of the further material layer produced in this manner corresponds, in an orthogonal projection onto the base surface, and at least in certain regions, to the structure that the topmost solidified material layer of the three-dimensional shaped object has in the orthogonal projection onto the base surface. Since even high-viscosity materials can be applied to a structured material layer using the contact printing method, it is even possible to produce shaped objects, using the method, which contain polymers that cannot be digitally printed. This allows high mechanical strength of the shaped object. Using the method according to the invention, it is possible to produce shaped objects of any desired height (without a height restriction) in accordance with predetermined geometric data. The average component height of the shaped object usually amounts to 0.1 m to 1 m. In practice, it is restricted only by limits of machine construction, such as the maximally permissible stroke of the substrate part (printing table), or by application-related factors.

If necessary, material portions composed of different flowable first materials can be applied onto the base surface and/or onto a solidified material layer of the three-dimensional shaped object located on it, so as to produce the material layer produced from the material portions. During this process, the material portions composed of different flowable first materials are preferably applied offset relative to one another in the expanse direction, corresponding to the base surface, in accordance with the geometric data assigned to them, in such a manner that the different first materials do not mix or mix with one another only slightly during application. In a top view onto the base surface, the material layer produced in this manner then has regions that consist of different first materials. These regions can border on one another directly and/or can be spaced apart from one another by interstices. In particular, at least one first material can serve as a construction material, and at least one further first material can serve as a support material. In this regard, the support material can be dissolved in a liquid in which the construction material cannot dissolve. Therefore, the support material can be dissolved out of the layer stack after application of all the material layers, by means of bringing the shaped object into contact with the solvent. In this manner, it is possible to produce shaped objects having overhangs or cavities, for example, using the support material.

In the case of a preferred embodiment of the method, the material portions are applied onto the base surface and/or onto the solidified material layer of the three-dimensional shaped object located on it. This can be done using a nozzle, for example.

In the case of an advantageous further development of the method, it is provided
that after solidification of the further material layer, material portions of the flowable first material are applied onto this material layer in accordance with the geometric data, so as to produce a material layer of the three-dimensional shaped object,
or
that after solidification of the further material layer, a surface region of the transfer body is coated with a layer of the at least one flowable second material, and this layer is brought into contact with the surface of the topmost solidified material layer that faces away from the base surface, that the flowable second material is transferred to the surface of the topmost solidified material layer of the three-dimensional shaped object from the transfer body and forms a further material layer, the structure of which corresponds to that of the topmost solidified material layer,
and that the topmost material layer obtained in this manner is solidified. After solidification of the material layer produced using the contact printing method, at least one further material layer can therefore be applied to the former, in the same manner, so as to reinforce the material layer first mentioned. Alternatively, after solidification of the material layer produced using the contact printing method, at least one further material layer can also be applied by means of application of material portions onto the material layer produced using the contact printing method.

In the case of a further development of the method, a material layer composed of the at least one first material is applied to the solidified material layer composed of the second material, by means of applying material portions, in a structured manner, in such a manner that at least one passage hole that extends all the way to the solidified material layer that lies underneath is formed between two regions of this material layer that are adjacent to one another in the expanse plane of the material layer last mentioned, that the material layer structured in this manner is solidified afterward, that afterward, the second material is applied onto this material layer by means of the transfer body, and that at least one cross-sectional dimension of the passage hole is adapted a.) to the pressure with which the second material is applied to the material layer that has the passage hole, and/or b.) to the material thickness with which the second material is applied to the material layer that has the passage hole, and/or c.) to the viscosity of the second material, in such a manner that the passage hole is filled with the second material applied by means of the transfer body, and the second material comes into contact with the solidified material layer first mentioned. The distance between the regions of the material layer that are located on both sides of the passage hole in the expanse plane of the material layer is preferably selected to be less than the material thickness of this material layer, in particular less than half and preferably less than one-third of the material thickness. The passage hole can be configured to be open at the edge on the side and, in particular, in slit shape.

If the second material has a greater mechanical strength than the first material, the shaped object produced according to the method is reinforced not only parallel to the material layers (e.g. horizontally) but also transverse to them (e.g. vertically). In this regard, it is actually possible that the second material forms a honeycomb structure, which reinforces the first material.

With regard to the device, the task mentioned above is accomplished with a device which has at least one material application mechanism for applying a further material layer, the surface of which is preferably arranged at a constant distance from the base surface. The material application mechanism has a transfer body and a coating mechanism that stands in contact with the second reservoir, by means of which mechanism the at least one surface region of the transfer body can be coated with a layer of the second material. The device has a second positioning mechanism, by means of which the surface region of the transfer body can be brought into contact with the surface of the topmost solidified material layer that faces away from the base surface, in such a manner that the flowable second material is transferred from the transfer body to the surface of the topmost solidified first material layer as the further material layer. The structure of the further material layer corresponds, at least in certain regions, to that of the topmost solidified material layer.

The invention therefore provides a hybrid printing device, which, in addition to the "digital" printing device that has the dispensing mechanism for application of the material portions, has an "analog" contact printing device that has a transfer body to which a layer of the flowable second material located in the second reservoir can be applied, so as to then transfer the second material to the previously produced solidified first material layer composed of the first material, at those regions of this layer that correspond to the first layer. In this regard, the structure of the further material layer applied to the first material layer in this manner corresponds to the structure of the first material layer. Since even high-viscosity materials can be applied to a structured material layer using a contact printing device, it is even possible to produce shaped objects that contain long-chain polymers using the device. This allows great mechanical strength of the shaped object. Furthermore, the contact printing device allows fast production of the further material layer.

It is advantageous if the device has a first leveling mechanism that has a first leveling tool, which can be brought into contact with the surface of a material layer composed of the at least one flowable first material applied to the base surface and/or to a solidified material layer, in such a manner that the surface of the at least one flowable first material is arranged at a constant distance from the base surface. In this regard, the leveling tool can be a doctor blade that picks up material, in the simplest case.

If necessary, the material application mechanism can have a second leveling mechanism, which has a second leveling tool, which can be brought into contact with the surface of a material layer composed of the flowable second material and applied to the base surface and/or to a solidified material layer, in such a manner that the surface of the flowable second material is arranged at a constant distance from the base surface. In this case, too, the leveling tool can be a doctor blade that picks up material, in the simplest case.

In the case of a preferred embodiment of the invention, the first and/or the second leveling tool is/are structured as a smoothing roll, which is mounted so as to rotate about an axis of rotation disposed parallel to the base surface, relative to the substrate part. The smoothing roll can preferably be driven by means of a corresponding drive, wherein the direction of rotation is preferably oriented counter to the advancing movement of the substrate part. Possible partial regions of the flowable material that project beyond the level to be leveled remain adhering to the mantle surface of the smoothing roll and are carried along by it in the direction of rotation. The excess material can be removed from the mantle surface using a stripper, and carried away to a waste container. The smoothing roll allows particularly precise leveling of the surface of the flowable first and second material, and allows a constantly consistent total layer thickness of the layer stack formed by the material layers that consist of the first and second materials.

In the case of a preferred embodiment of the invention, the dispensing mechanism for dispensing the material portions has at least one digital material dispensing unit, preferably having a nozzle. In this regard, a digital material dispensing unit is understood to be a mechanism by means of which a predetermined amount of the material to be printed is either dispensed or not, as a function of a logic signal.

In the case of an advantageous further development of the invention, it is provided that the dispensing mechanism has at least one row having several material dispensing units arranged next to one another for dispensing the material portions, and that the row extends parallel to the base surface and transverse to the direction in which the dispensing mechanism and the substrate part can be moved relative to one another, parallel to the base surface. In this regard, it is even possible that the material dispensing unit row extends over the entire width of the region to be imprinted. This allows fast material application over the full area. If necessary, at least two material dispensing units can be provided, which are connected with separate reservoirs, in which different first materials can be kept on hand, for example a flowable construction material and a flowable support material.

In the case of a further development of the invention, the transfer body is structured as an application roll, which can be driven to rotate about an axis of rotation disposed parallel to the base surface, using the second positioning mechanism. In this regard, the application roll can be, in particular, a coating roll.

In the case of a practical embodiment of the invention, it is provided that a feed roll is assigned to the application roll; the former can be driven to rotate about a roll axis disposed parallel to the axis of rotation of the application roll, and is immersed into the second reservoir with a partial region of its mantle surface so as to coat its mantle surface with the flowable second material; and that the mantle surface of the feed roll is tightly adjacent to the mantle surface of the application roll, in such a manner that the second material applied to the mantle surface of the feed roll can be transferred to the mantle surface of the application roll in the case of a rotational movement of the feed roll about the roll axis. The feed roll allows simple and uniform coating of the mantle surface of the application roll with the flowable second material.

In the case of a particularly preferred embodiment of the invention, the application roll is structured as a rotation screen-printing roll. Due to the very high viscosity of the printing materials to be processed and the layer structure thickness, in this way particularly strong and fast coating can be achieved.

In the case of an embodiment of the invention, the arrangement formed by the dispensing mechanism and the application roll, along with the substrate part, can be moved back and forth relative to one another by means of the first positioning mechanism, along a straight line arranged parallel to the base surface. In the case of this embodiment, the geometric data for the shaped object are preferably provided in a Cartesian coordinate system, either in the form of pixels or in vectorized form. The coordinates of the locations at which the material portions are dispensed onto the base surface or onto a solidified material layer of the three-dimensional shaped object located on it are also preferably present in a Cartesian coordinate system.

In the case of another advantageous embodiment of the invention, the arrangement formed by the dispensing mechanism and the application roll, along with the substrate part, can be rotated relative to one another by means of the first positioning mechanism, about an axis of rotation that lies normal to the base surface, wherein the application roll is configured conically, and wherein the axis of rotation of the application roll runs through the axis of rotation. In the case of this embodiment, as well, the geometric data for the shaped object are preferably provided in a Cartesian coordinate system, either in the form of pixels or in vectorized form. The coordinates of the locations at which the material portions are dispensed onto the base surface or onto a solidified material layer of the three-dimensional shaped object located on it, however, are preferably present in a polar coordinate system. The axis of rotation of the application roll can be a physical axle of rotation or an imaginary line.

It is advantageous if the arrangement formed by the dispensing mechanism and the application roll, along with the substrate part, can be moved away from one another and toward one another by means of the first positioning mechanism, normal to the base surface. The base surface can then be lowered, after application of a material layer, by the thickness of this material layer, in each instance. As a result, the distance between the dispensing mechanism and the location at which the material portions are applied remains constant in the case of all the material layers. The distance between the application roll and the location at which the second material is applied with the application roll also remains constant. Depending on the mode of operation, lowering can also be carried out in non-uniform manner, for example if different layer thicknesses are applied.

In the case of a preferred embodiment of the invention, the second material has a greater mechanical strength in the solidified state than the first material and/or the second material has different mechanical, electrical or chemical properties from the first material. In this case, the material layers having the second material serve as reinforcement layers, which increase the mechanical strength or the stability of the shaped object, or functionally expand its property. The reinforcement or expansion can be adjusted by changing the layer thickness of the second material or of the reinforcement material. During this process, the mechanical strength of the shaped object increases with the layer thickness of the material layer(s) that consist of the second material. The material layers composed of the low-viscosity first material, which can be a standard polymer, for example, serve as a setup material.

The second material can be a non-filled material, preferably a homogeneous material. The second material can also be filled material, which contains at least one organic filler and/or at least one inorganic filler. The filler can comprise, for example, particles, fibers or lamellae, which are embedded in a carrier medium. The carrier medium can contain a solvent, a binder and/or a reactive resin, for example.

In the case of an advantageous embodiment of the invention, the second material is electrically and/or optically and/or magnetically conductive, and the first material is electrically and/or optically and/or magnetically insulating. The device according to the invention and the method according to the invention are therefore also suitable for manufacturing printed electrical and/or optical circuits. The method and the device allow very flexible and fast implementation of electrical and/or optical connection in and on three-dimensional shaped objects printed layer by layer. In this regard, the material layer printed by means of the dispensing mechanism for dispensing material portions determines the connection progression of the electrically and/or optically conductive tracks applied to it. A particularity is the ability to print conductor tracks in the interior of the shaped objects, without an extra conductor plate being required for this purpose.

A further particularity makes this solution cost-advantageous: the usual nano-inks on the market, with silver particles, are very expensive, because they have to be conductive but have low viscosity. The conductive material that can be used for the invention can correspond, with regard to its viscosity, to the viscosity of the printing materials used in stencil printing, which are already very widespread on the market and are more cost-advantageous than low-viscosity inks with nano silver particles.

It should still be mentioned that the flowable materials can have different barrier properties. Thus, for example, it is possible for one of the materials to be permeable for gases and/or liquids, and the other one not.

To produce overhangs, it is possible to apply at least one support material for the first flowable material to the base surface and/or to a solidified material layer of the three-dimensional shaped object, using the dispensing mechanism, in certain regions. After the support material has been solidified and a material layer having the second material has been applied to the support material using the transfer body, and these have also been solidified, the support material can be removed by bringing it into contact with a solvent, such as water, for example.

BRIEF DESCRIPTION OF THE DRAWINGS

In the following, exemplary embodiments of the invention will be explained in greater detail, using the drawing. This shows.

DESCRIPTION OF THE INVENTION

Figure 1:
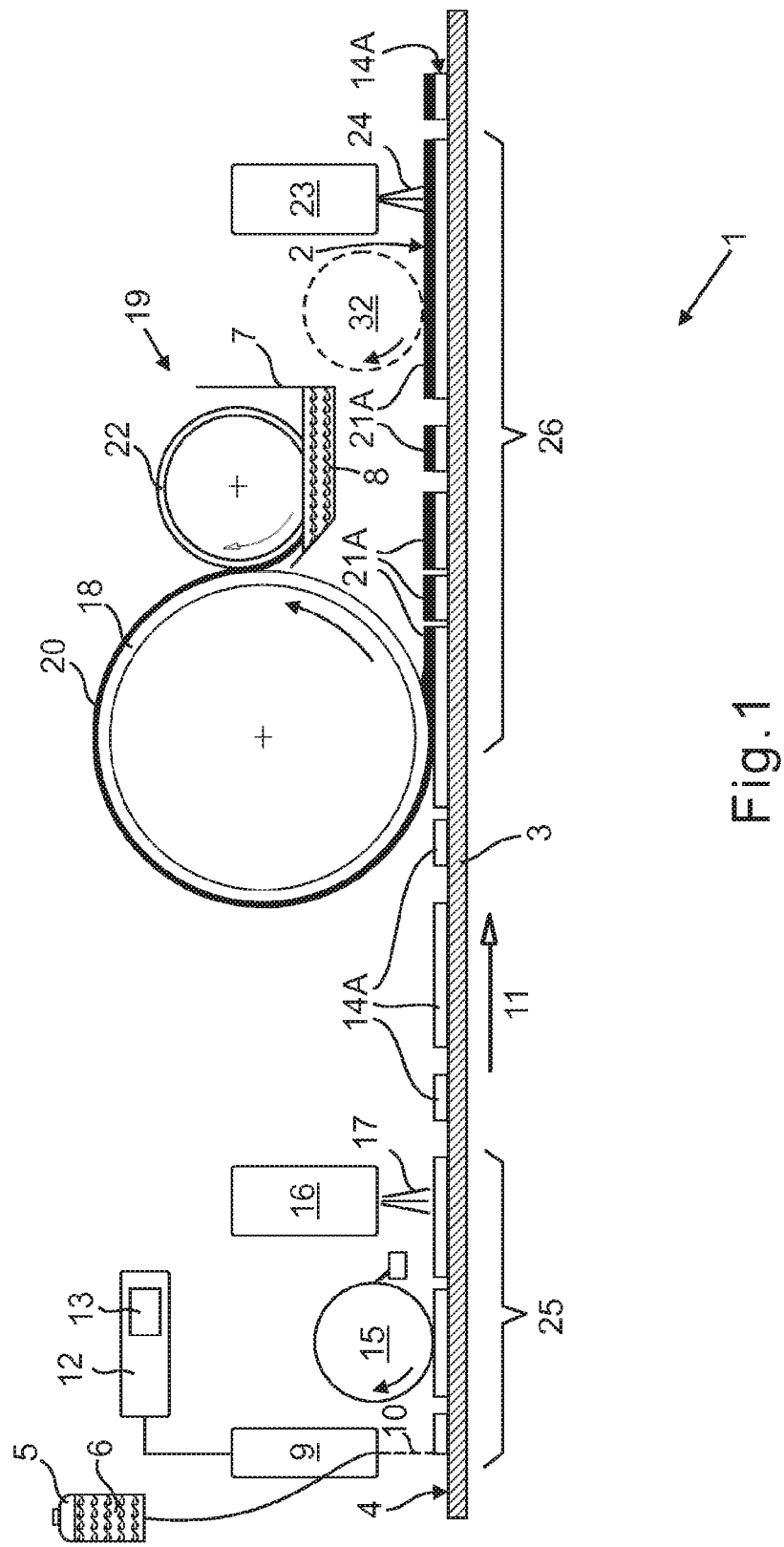
FIG. 1 a longitudinal section through a device for producing a three-dimensional shaped object, during a first work pass during which two material layers of the shaped object are applied, wherein the device has a coating roll, FIG. 2 a longitudinal section through the device shown in FIG. 1, during a first work pass during which two further material layers are applied, FIG. 3 a longitudinal section through the device shown in FIG. 1, during a work pass during which a further material layer is applied to a material layer of the shaped object, the former composed of the same material as the material layer first mentioned, FIG. 4 a longitudinal section through a device for producing a three-dimensional shaped object, which has a rotation screen-printing roll, FIG. 5 a longitudinal section through a printed circuit board, FIG. 6 a top view of the printed circuit board, FIG. 7 a longitudinal section through a shaped object, and FIG. 8 a representation similar to FIG. 1, wherein, however, the device is configured for applying material portions of two different first materials.

A device, designated in FIG. 1 as a whole with 1, for producing a three-dimensional shaped object 2 by means of layer-by-layer material application, has a plate-shaped substrate part 3 having a base surface 4 for holding the shaped object 2, disposed in a horizontal plane. The base surface 4 is structured essentially in rectangular form. However, other embodiments are also conceivable, in the case of which the base surface 4 can have, in particular, the form of a circular disk or of a circular ring disk.

The device furthermore has a first reservoir 5 for holding a flowable first material 6 and a second reservoir 7 for holding a flowable second material 8 that differs from the flowable first material 6. As can be seen in FIG. 1, the first reservoir 5 is configured as an essentially closed container, and the second reservoir 7 is configured as a tub.

The first reservoir 5 is connected, by way of a line, with a dispensing mechanism 9 for the first material 6, which mechanism is fixed in place or disposed in movable manner. The dispensing mechanism 9 is configured as an inkjet print head having a plurality of nozzles arranged in a row, not shown in any detail in the drawing, which are directed, for dispensing material portions 10 of the first material 6, onto the base surface 4 or onto a solidified material layer of the three-dimensional shaped object 2 located on it. The row of nozzles is arranged parallel to the two short edges of the rectangular base surface 4 and extends over its entire width.

The substrate part 3 and the dispensing mechanism 9 can be displaced relative to one another using a first positioning mechanism not shown in any detail in the drawing, in and counter to the direction of the arrow 11.

The dispensing mechanism 9 and the first positioning mechanism are connected with a control mechanism 12, which has a data memory 13 for storing geometric data of the shaped object 2 to be produced. Dispensing of the material portions 10 and the positioning mechanism can be controlled by means of the control mechanism 12, in known manner, as a function of the geometric data, in such a manner that material layers 14A of the three-dimensional shaped object 2 composed of the flowable first material 6 can be applied to the base surface 4 and/or to the solidified material layer of the three-dimensional shaped object 2 located on it, in the form of a layer stack.

For smoothing and leveling of the topmost material layer 14A, in each instance, composed of the flowable first material 6, a first leveling mechanism is provided ahead of the dispensing mechanism 9 in the direction of the arrow 11, which mechanism has a first smoothing roll 15, which is mounted so as to rotate about its (imaginary) axis of rotation, relative to the substrate part 3. The direction of rotation of the smoothing roll 15 is oriented counter to the advancing movement of the substrate part 3 indicated by the arrow 11. Partial regions of the flowable first material that project above the level to be leveled remain adhering to the mantle surface of the smoothing roll 15 and are carried along by it in the direction of rotation. The material is removed from the mantle surface using a stripper indicated only schematically in the drawing, and passed to a waste container.

The axis of rotation of the first smoothing roll 15 is disposed parallel to the base surface 4 and normal to the direction of the arrow 11. Furthermore, the imaginary axis of rotation of the smoothing roll 15 is fixed in place with reference to the dispensing mechanism 9, i.e. the dispensing mechanism 9 and the first smoothing roll 15, on the one hand, as well as the substrate part 3, on the other hand, can be displaced relative to one another by means of the first positioning mechanism, in and counter to the direction of the arrow 11.

The smoothing roll 15 and the substrate part 3 can be moved relative to one another, in and counter to the direction of the arrow 11. In the case of the exemplary embodiments shown in the drawing, the imaginary axis of rotation of the smoothing roll 15 is fixed in place, and the substrate part 3 can be moved relative to it. However, it is also conceivable that the substrate part 3 is fixed in place, and the axis of rotation of the smoothing roll 15 as well as the dispensing mechanism 9 can be moved.

A gap is formed between the first smoothing roll 15 and the base surface 4 or the surface plane of the topmost solidified material layer located on it, the vertical dimension of which gap corresponds to the thickness of the material layer to be applied. The gap extends over the entire width of the base surface 4 that is to be coated. The distance between the top edge of the gap or the lowest point of the mantle surface of the smoothing roll 15, on the one hand, and the base surface 4, on the other hand, is kept constant, in each instance, during application of the individual material layers.

A first fixation mechanism 16 for solidifying the material layers 14A composed of the flowable first material 6 is arranged ahead of the first smoothing roll 15, in the direction of the arrow 11. This mechanism has a UV radiation source, not shown in any detail in the drawing, by means of which UV radiation 17 can be given off to the topmost material layer 14A. The wavelength and the intensity of the UV radiation 17 are selected in such a manner that polymers and/or copolymers located in the topmost material layer 14A crosslink.

Ahead of the first fixation mechanism 16 in the direction of the arrow 11, the device 1 has a transfer body 18 configured as a flexo-printing roll, and a coating mechanism 19 that stands in contact with the second reservoir, by means of which the at least one surface region of the transfer body 18 can be coated with a layer 20 of the second material 8.

The surface region of the transfer body 18 can be brought into contact with the surface of the topmost solidified material layer that faces away from the base surface, using a second positioning mechanism not shown in any detail in the drawing, in such a manner that the flowable second material 8 is transferred from the transfer body 18 to the surface of the topmost solidified first material layer 14A as a further material layer 21A, the structure of which corresponds to that of the topmost solidified material layer 14A. Using the second positioning mechanism, the roll-shaped transfer body 18 can be rotated about an imaginary axis of rotation, which is disposed parallel to the base surface 4 and normal to the direction of the arrow 11, in such a manner that the layer 20 of the second material 8 located on the mantle surface of the transfer body 18 rolls off onto the topmost solidified material layer when the substrate part 3 and the dispensing mechanism 9 are moved relative to one another in the direction of the arrow 11.

The first and the second positioning mechanism can preferably be driven using separate drive motors, independent of one another. However, it is also conceivable that the first and the second positioning mechanism have a common drive motor.

Figure 2:
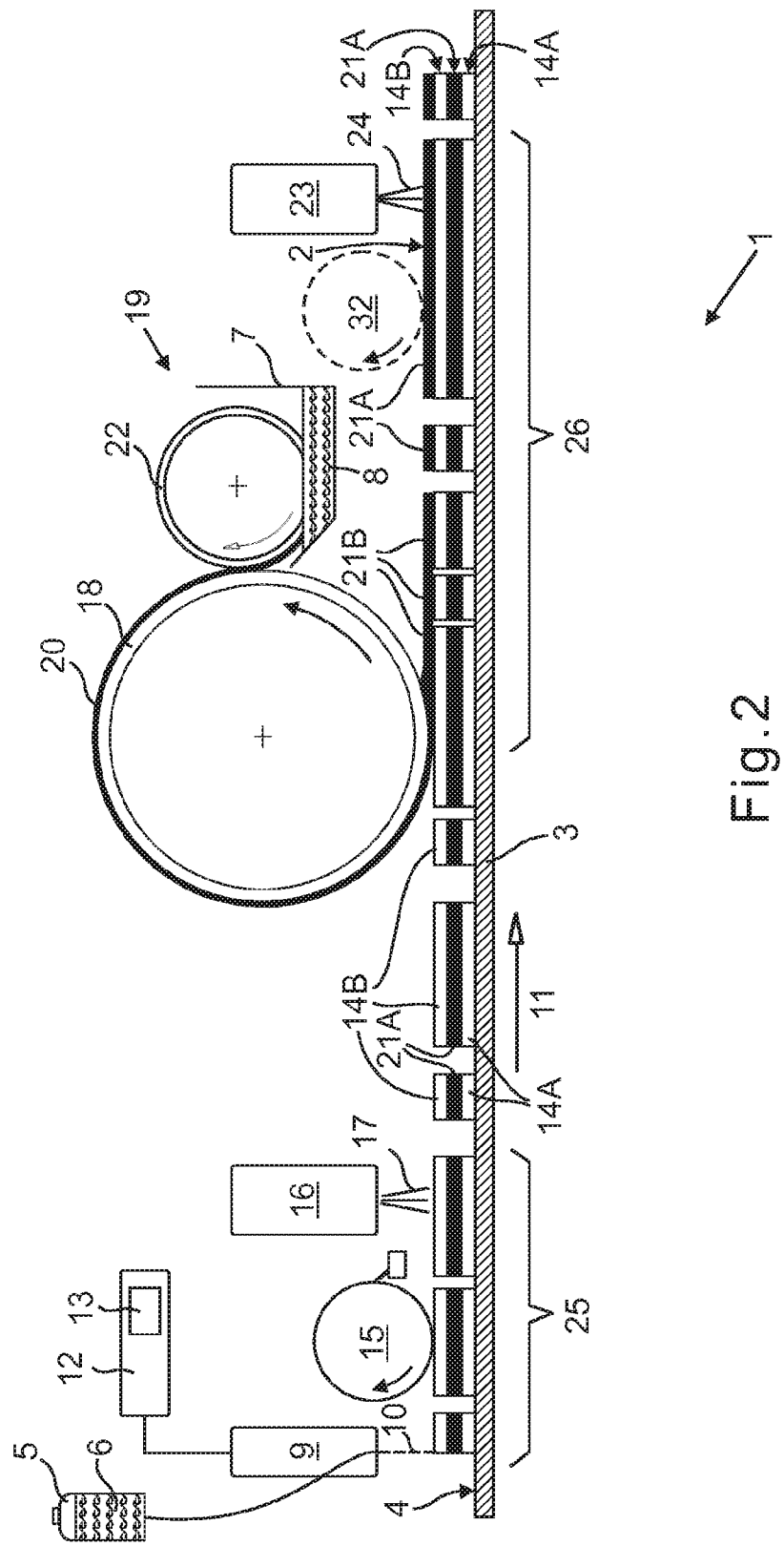
Figure 3:
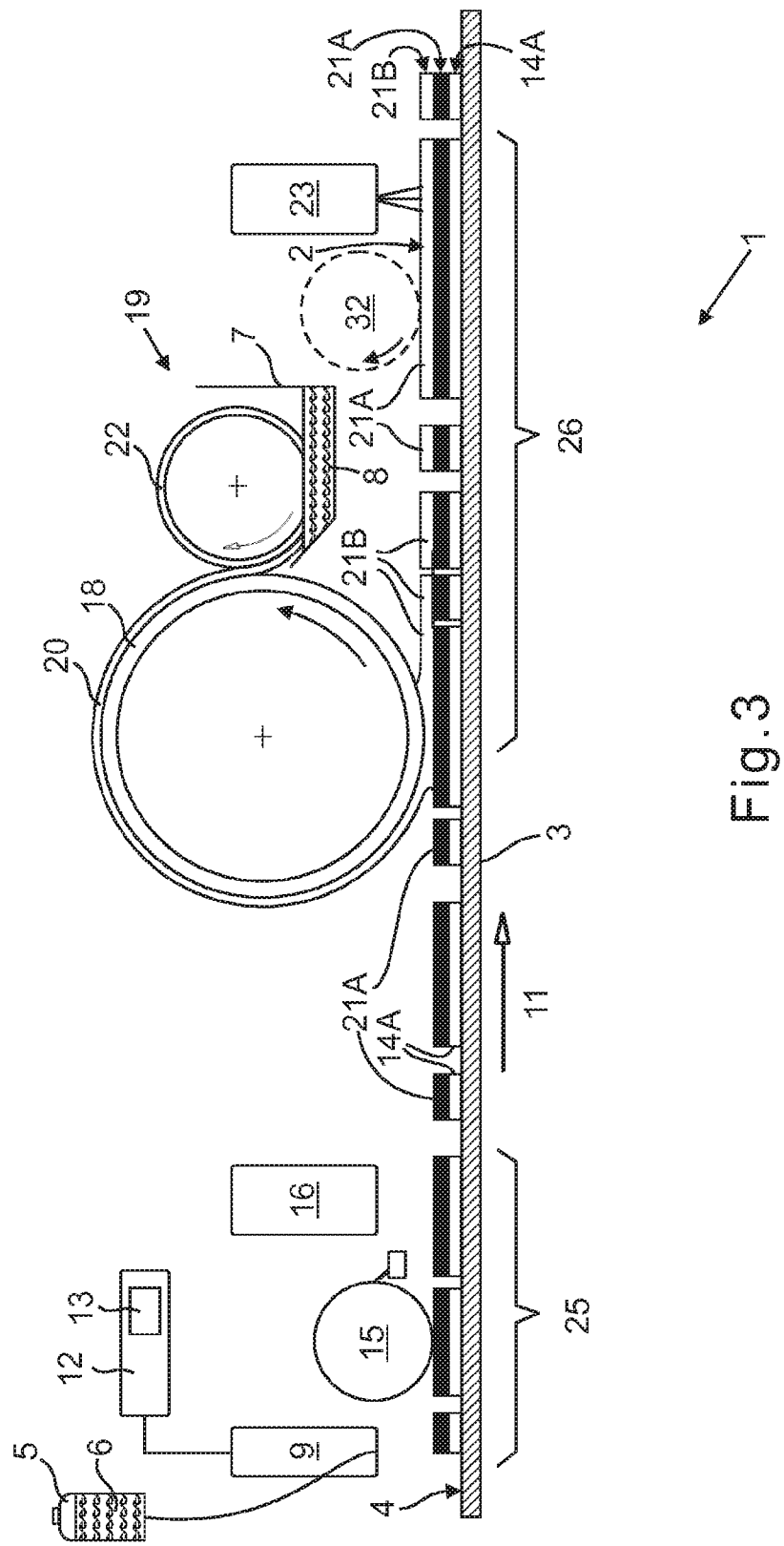

In the case of the exemplary embodiment shown in FIGS. 1 to 3, the coating mechanism has a feed roll 22, which can be driven to rotate about a roll axle disposed parallel to the axis of rotation of the transfer body 18. To coat its mantle surface with the flowable second material 8, the feed roll 22 is immersed into the second reservoir 7, i.e. the flowable second material 8 located in it, with a lower partial region of its mantle surface.

The mantle surface of the feed roll 22 is so closely adjacent to the mantle surface of the transfer body 18 that the second material 8 applied to the mantle surface of the feed roll 22 can be transferred to the mantle surface of the transfer body 18 in the case of a rotational movement of the feed roll 22 about its roll axis. From there, the second material 8 is transferred to the topmost solidified material layer 14A, 14B of the shaped object 2 to be produced.

For smoothing and leveling the topmost material layer 21A, 21B, composed of the flowable second material 8, if necessary a second leveling mechanism can be provided ahead of the transfer body 18a in the direction of the arrow 11, which mechanism has a second smoothing roll 32, which is mounted to rotate about its (imaginary) axis of rotation, relative to the substrate part 3. The axis of rotation of the second smoothing roll 32 is disposed parallel to the base surface 4 and normal to the direction of the arrow 11. Furthermore, the imaginary axis of rotation of the second smoothing roll 32 is locally fixed with reference to the mounting of the transfer body 18, i.e. the transfer body 18 and the second smoothing roll 32, on the one hand, as well as the substrate part 3, on the other hand, can be displaced relative to one another by means of the first positioning mechanism, in and counter to the direction of the arrow 11.

For solidifying the topmost material layer 21A that consists of the flowable second material 8, a second fixation mechanism 23 is arranged ahead of the transfer body 18 in the direction of the arrow 11. This mechanism has a UV radiation source not shown in any detail in the drawing, by means of which UV radiation 24 can be given off to the topmost material layer 21A. The wavelength and the intensity of the UV radiation 24 are selected in such a manner that polymers and/or copolymers located in the topmost material layer 21A crosslink. The fixation mechanisms 16, 23 are locally fixed with reference to the dispensing mechanism 9.

In summary, the result is therefore obtained that using the device 1, first a structured material layer 14A composed of the first material 6 is produced by means of a digital printing process 25 and solidified, and that afterward, a further material layer 21A having a corresponding structure and composed of the second material 8 is applied to this material layer 14A by means of an analog printing process 26 and solidified.

After the first material layer 14A composed of the first material 6 and the first further material layer 21A composed of the second material 8 have been completed as described above on the base surface 4, the substrate part 3 is lowered, by means of the first positioning mechanism 4, by the total of the wall thicknesses of these material layers 14A, 21A, relative to the dispensing mechanism 9, to the smoothing roll 15, to the fixation mechanisms 16, 23, and to the transfer body 18. Furthermore, the substrate part 3 is moved back into its starting position, counter to the arrow direction of the arrow 11, so that afterward, in corresponding manner, a second material layer 14B composed of the first material 6, as well as a second further material layer 21B composed of the second material 8 can be applied to the solidified first further material layer 21A (FIG. 2). These steps are repeated until the shaped object 2 is complete. During this process, the method steps can be performed at least twenty times, if necessary at least fifty times, and preferably at least several thousand times.

In FIG. 3, it can be seen that multiple further material layers 21A, 21B composed of the second material 8 can also be layered directly one on top of the other, using the transfer body 18, so as to increase the material thickness. Although these layers consist of the same material, they are shown differently in FIG. 3, for reasons of better legibility, namely layer 21A in black and layer 21B in white. During application of the second further material layer 21B, the dispensing mechanism 9 and the first fixation mechanism 16 are inactive.

Figure 4:
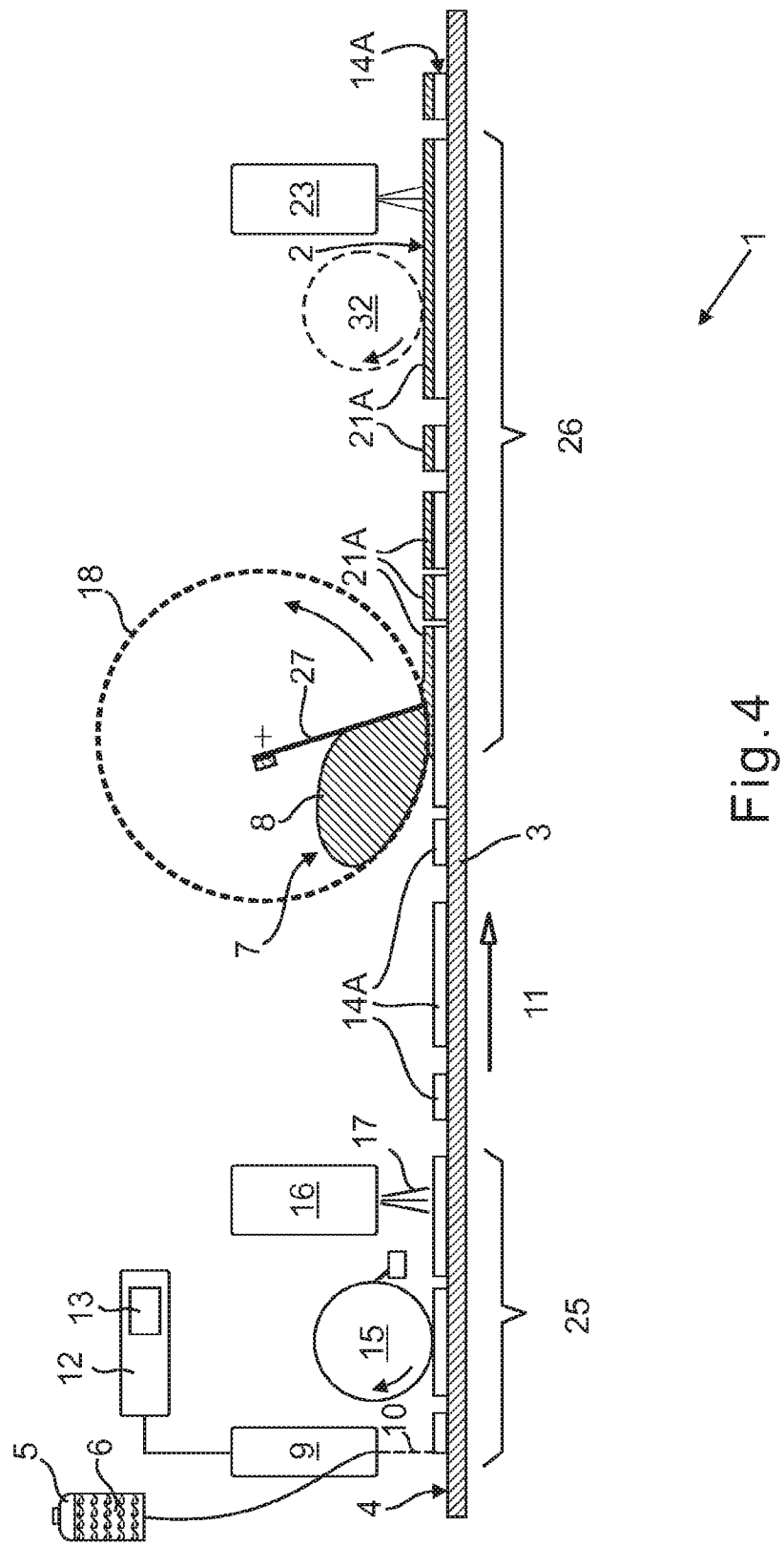

In the case of the exemplary embodiment shown in FIG. 4, the transfer body 18 is structured as a rotation screen-printing roll. This roll has a perforated, screen-like mantle surface. The second reservoir 7 is disposed in the inner cavity of the rotation screen-printing roll.

The perforation holes provided in the mantle surface are coordinated, with regard to their dimensions, to the viscosity of the second material 8, in such a manner that the second material 8 can be pressed through the perforation holes by means of a doctor blade 27 that lies against the inner mantle surface of the cylinder wall of the rotation screen-printing roll in line form. Outside of the region of effect of the doctor blade 27, the second material 8 does not pass through the perforation holes.

For the remainder, the device shown in FIG. 4 corresponds to the device shown in FIGS. 1 to 3, so that the description of FIGS. 1 to 3 applies accordingly to FIG. 4.

Figure 5:
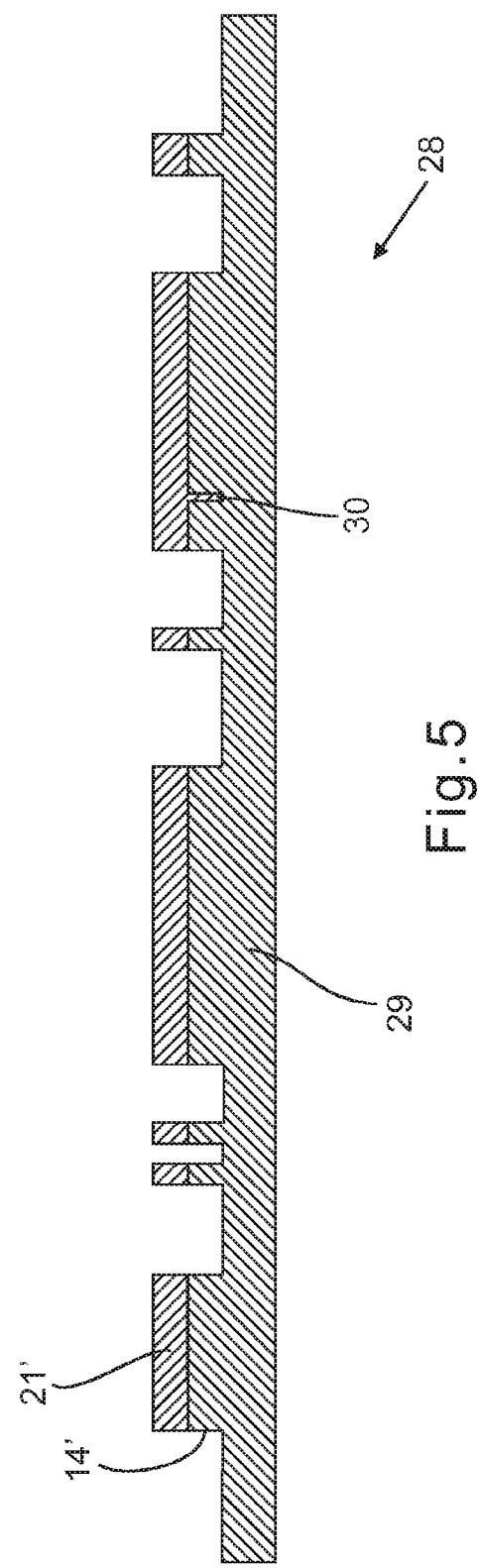
Figure 6:
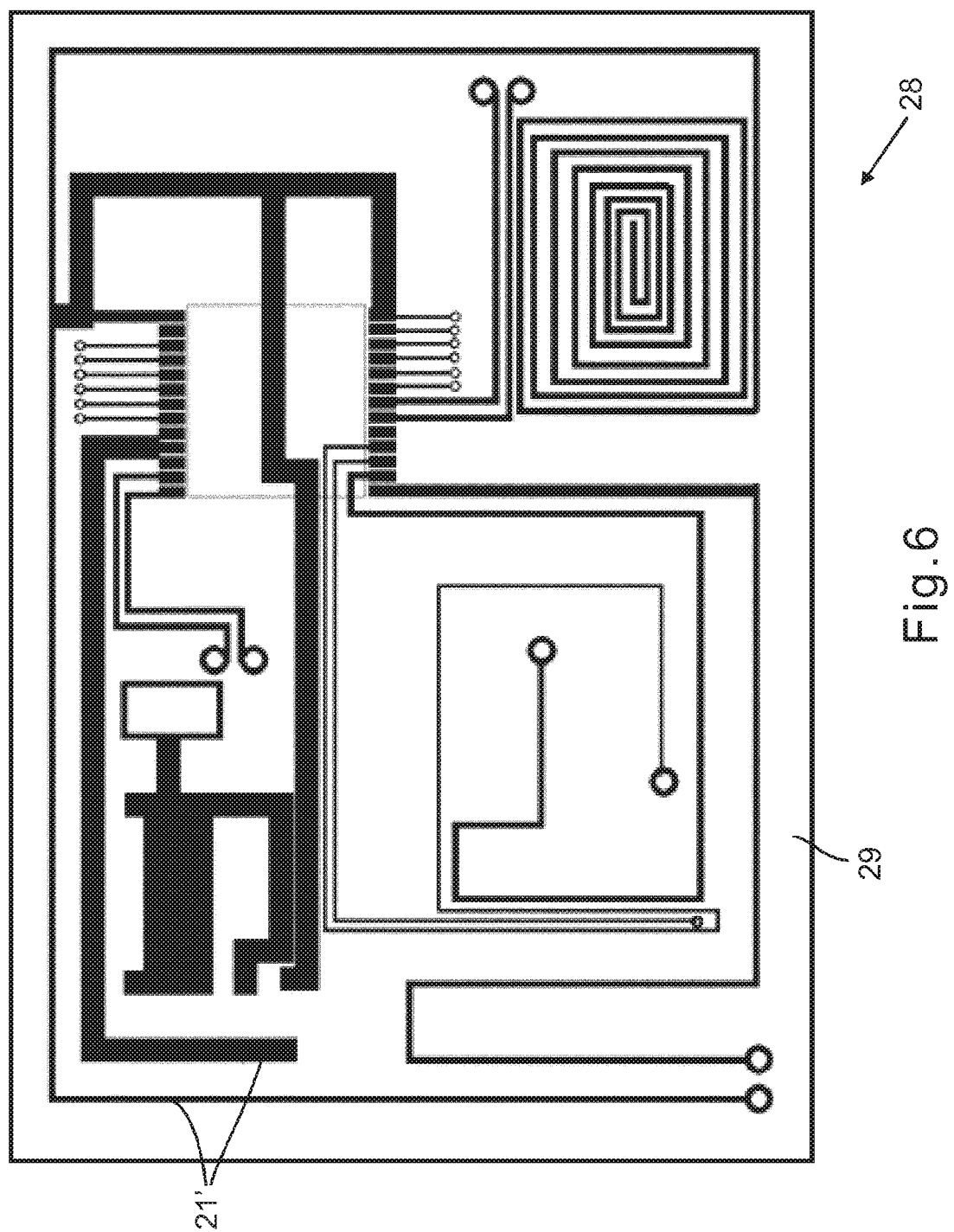

The device can also be used for producing printed electrical circuit boards 28 (FIGS. 5 and 6). In this regard, first an insulation corpus 29 structured on its surface is produced using the dispensing mechanism 9, by means of layer-by-layer material application of an electrically insulating material, and solidified. In a further method step, using the transfer body 18, at least one further material layer 21' composed of a high-viscosity electrically conductive material is applied to the topmost structured material layer 14' and solidified.

In the case of the exemplary embodiment shown in FIG. 5, the material layer 14' having the first material 6 is structured in such a manner that it has a passage hole 30 in at least one location, which hole passes through the material layer 14' transverse to its expanse plane, all the way to the material layer located underneath. The cross-sectional dimension or the clear width of the passage hole 30 is so small that the material film of the second material 8 does not tear off during application of the material layer 21' at the edge of the passage hole 30. As a result, the second material 8 that serves as a reinforcement material flows into the passage hole 30 during application of the material layer 21'. Therefore, a support structure is formed by the material layer 21', which reinforces the circuit board 28 both parallel to its expanse plane (horizontally) and transverse to it (vertically). By means of this measure, the risk that the material layer 21' that serves as a conductor track will come loose from the insulation corpus 29, in particular in the case of bending stress on the circuit board 28, is reduced.

Figure 7:
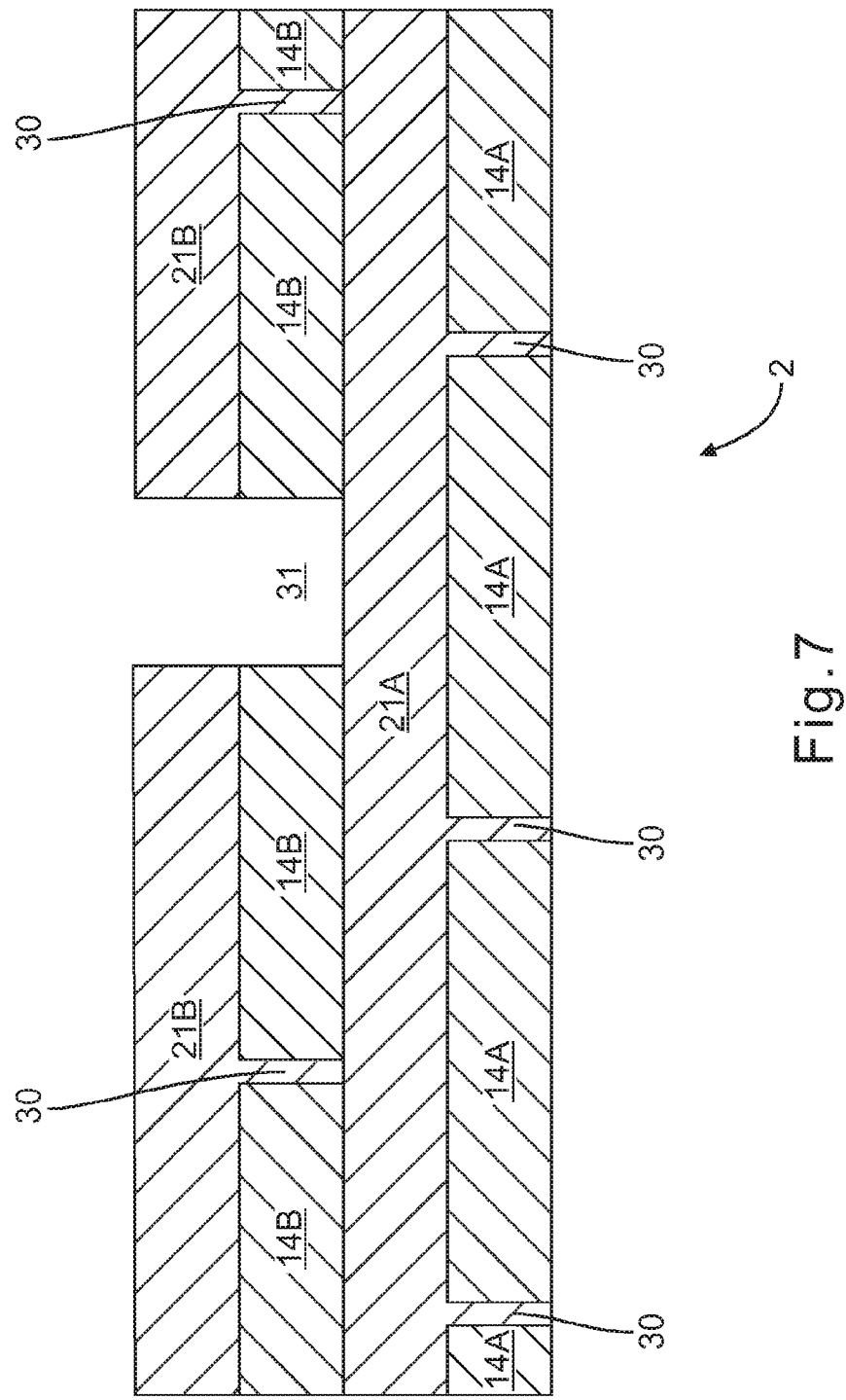

FIG. 7 shows a longitudinal section through a shaped object 2, in which the second material of the material layers 21A, 21B, which serve as a reinforcement layer, extends through passage holes 30 of the layer 14A, 14B, which is composed of the first material 6, which holes are disposed underneath, in each instance. It can be clearly seen that the material layer 21B contacts the material layer 21A located underneath it through the passage holes 30. By means of the reinforcement structure formed in this manner, the shaped object 2 is reinforced both parallel to the material layers 14A, 14B, 21A, 21B and also transverse to them.

The clear width of the passage holes 30 is less than 25% of the vertical distance between the material layers 14A, 14B composed of the first material 6. As a result, the material film of the second material 8 does not tear off at the edge of the passage holes 30 when the material layers 21A, 21B are applied.

As can furthermore be seen in FIG. 7, a passage opening 31 formed in the material layer 14B, the clear width of which opening is greater than the vertical distance between the material layers 14A, 14B, is not filled with the second material 8. In the region of this passage opening 31, the structure of the material layer 21B therefore corresponds to that of the material layer 14B that lies underneath.

Figure 8:
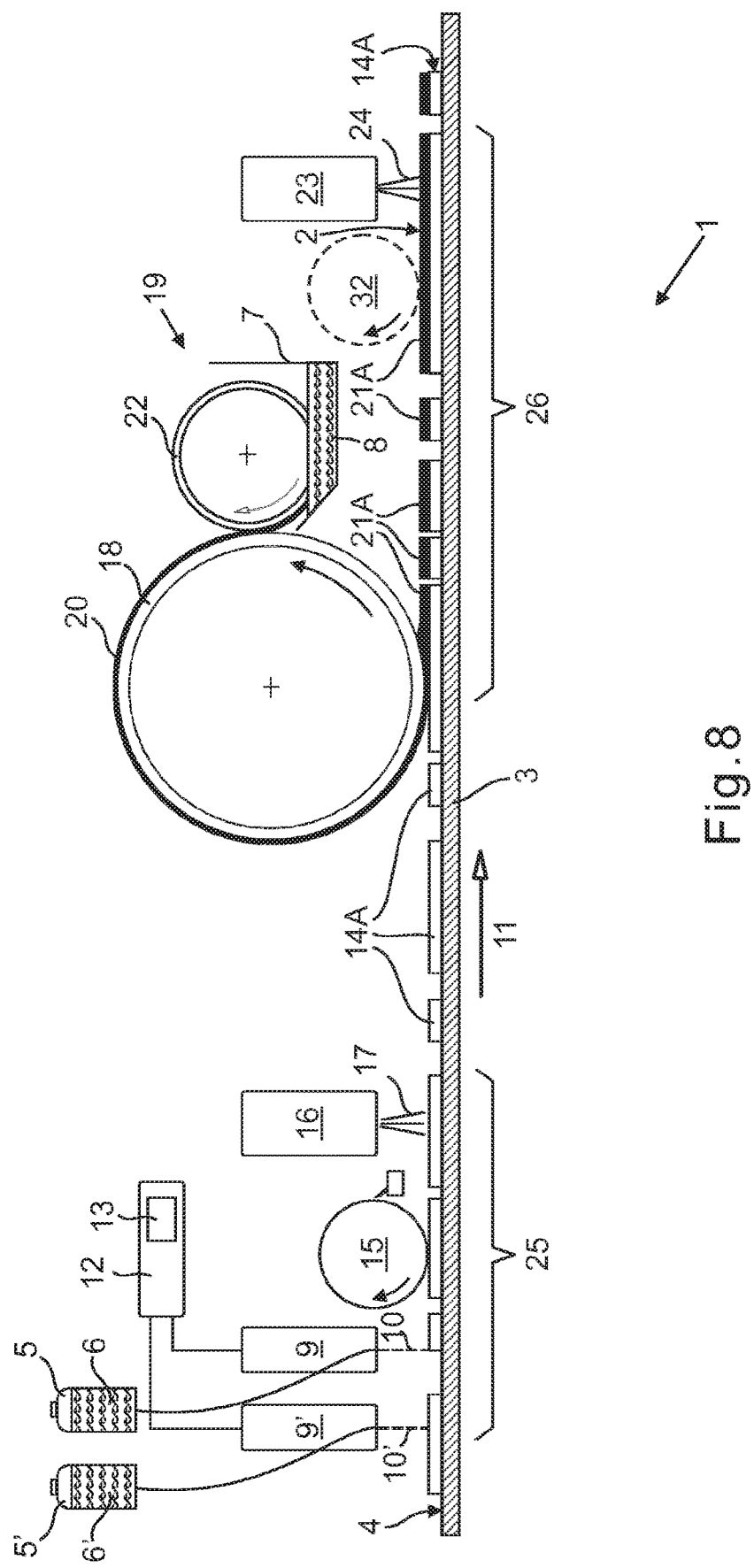

The device 1 can also be structured for applying material portions of two different first materials 6, 6'. As can be seen in FIG. 8, for this purpose the device 1 has two first reservoirs 5, 5', which are each connected with a locally fixed dispensing mechanism 9, 9' (inkjet print head) for the respective first material 6, 6' that is assigned to them, by way of a line. The one first reservoir 5 is filled with a flowable construction material 6, and the other first reservoir 5' is filled with a flowable support material 6'. Using the one dispensing mechanism 9, material portions 10 of the first material 6 can be dispensed, and using the other dispensing mechanism 9', material portions 10' of the first material 6' can be dispensed onto the base surface 4 or onto a solidified material layer of the three-dimensional shaped object 2 located on it. The support material 6' that can be applied using the dispensing mechanism 9' can serve for supporting the construction material 6 during application of the material layers, in particular so as to produce overhangs. The two dispensing mechanisms 9, 9' are connected with a common control mechanism 12, which has a data memory 13 for storing geometric data of the shaped object 2 to be produced.

It is advantageous if, in addition to the first smoothing roll 15 and the first fixation mechanism 16, an additional smoothing roll and/or an additional fixation mechanism is/are disposed between the material-dispensing mechanisms 9' and 9 (not shown in FIG. 8), so as to level the first material 6' using the additional leveling mechanism, and that it is subsequently solidified using the additional fixation mechanism. This allows an additionally increased surface quality after solidification between the first materials 6' and 6.

In summary, the invention therefore relates to a method for producing a three-dimensional shaped object (2) by means of layer-by-layer material application, wherein geometric data for the shaped object (2), a substrate part (3) having a base surface (4) for holding the three-dimensional shaped object (2), as well as a flowable first material and a flowable second material (6, 8) that differs from the first are provided, wherein material portions (10) of the flowable first material (6) are applied to the base surface (4) and/or to a solidified material layer of the three-dimensional shaped object (2) located on it, in accordance with the geometric data, so as to produce at least one material layer (14A, 14B, 14') of the three-dimensional shaped object (2), and wherein the at least one material layer (14A, 14B, 14') composed of the flowable first material (6) and at least one further material layer (21A, 21B, 21') composed of the flowable second material (8) are solidified, wherein the method is characterized in that a transfer body (18) is provided, that a surface region of the transfer body (18) is coated with a layer (20) of the flowable second material (8), and this layer (20) is brought into contact with the surface of the topmost solidified material layer of the three-dimensional shaped object (2) that faces away from the base surface (4), in such a manner that the flowable second material (8) is transferred from the transfer body (18) to the surface of the topmost solidified material layer (14A) of the three-dimensional shaped object (2) and forms the further material layer (21A, 21B, 21') on it, the structure of which corresponds, at least in certain regions, to that of the topmost solidified material layer of the three-dimensional shaped object, and that the further material layer (21A, 21B, 21') is solidified.

Furthermore, the invention relates to a device (1) for producing a three-dimensional shaped object (2) by means of layer-by-layer material application, having a substrate part (3) having a base surface (4) for holding the shaped object (2), having a first reservoir (5) for holding a flowable first material (6) and a second reservoir (7) for holding a flowable second material (8) that differs from the first flowable material (6), having at least one dispensing mechanism (9) connected with the first reservoir (5) for dispensing material portions (10) of the first material (6) onto the base surface (4) and/or onto a solidified material layer of the three-dimensional shaped object (2) located on it, having a first positioning mechanism, by means of which the substrate part (3) and the dispensing mechanism (9) for applying the material portions (10) to the base surface (4) and/or to the solidified material layer can be movably positioned relative to one another, wherein the dispensing mechanism (9) and the first positioning mechanism are connected with a control mechanism (12) that has a data memory (13) for storing geometric data of the shaped object to be produced, wherein dispensing of the material portions (10) and the positioning mechanism can be controlled as a function of the geometric data, by means of the control mechanism (12), that at least one material layer (21A, 21B, 21') of the three-dimensional shaped object (2), composed of the first material (6), can be applied to the base surface (4) and/or to the solidified material layer of the three-dimensional shaped object (2) located on it, and having at least one fixation mechanism (16, 23) for solidifying the at least one material layer (14A, 14B, 14') composed of the flowable first material (6) and for solidifying at least one further material layer (21A, 21B, 21') composed of the flowable second material (8). The device (1) is characterized in that it has a transfer body (18) and a coating mechanism (19) that stands in contact with the second reservoir (7), by means of which the at least one surface region of the transfer body (18) can be coated with a layer (20) of the second material (8), that the device (1) has a second positioning mechanism, by means of which the surface region of the transfer body (18) can be brought into contact with the surface of the topmost solidified material layer that faces away from the base surface (4), in such a manner that the flowable second material (8) is transferred, as a further material layer (21A, 21B, 21'), the structure of which corresponds, at least in certain regions, to that of the topmost solidified material layer (14A), from the transfer body (18) to the surface of the topmost solidified first material layer.

The invention claimed is:

1. A device for producing a three-dimensional shaped object by means of layer-by-layer material application, comprising:
    a substrate part having a base surface for holding the shaped object,
    a first reservoir for holding a flowable first material and a second reservoir for holding a flowable second material that differs from the first material, and in the following order:
    a dispensing mechanism configured as an inkjet print head connected with the first reservoir for dispensing material portions of the first material onto the base surface and/or onto a solidified material layer of the three-dimensional shaped object located on the base surface, wherein the substrate part and the dispensing mechanism are movably positionable relative to one another during dispensing of the portions of the first material onto the base surface and/or onto the solidified material layer of the three-dimensional shaped object located on the base surface to form at least one first material layer, and wherein positioning of the substrate part relative to the dispensing mechanism is conducted according to geometric data of the shaped object to be produced which is stored on a data memory,
    a leveling tool, which is positionable to be brought into contact with the at least one first material in such a manner that a surface of the first material layer is arranged at a constant distance from the base surface,
    a first fixation mechanism for solidifying the at least one material layer composed of the first material,
    a material application mechanism configured to apply at least one second material layer not capable of being by dispensed by the dispensing mechanism and composed of the second material to a topmost solidified material layer, wherein a surface of the material application mechanism is arranged at a constant distance from the base surface, and the material application mechanism comprises a transfer body and a coating mechanism in contact with the second reservoir, wherein at least one surface region of the transfer body is coated with a layer of the second material via the coating mechanism, wherein the surface region of the transfer body is movably positionable relative to a surface of the topmost solidified material layer that faces away from the base surface to cause a layer of the second material to be transferred from the transfer body to the surface of the topmost solidified material layer, and the structure of the at least one second material layer corresponds in an orthogonal projection onto the base surface and at least in certain regions to a structure that the topmost solidified material layer of the three-dimensional shaped object has in the orthogonal projection onto the base surface, and
    a second fixation mechanism for solidifying the at least one material layer composed of the second material,
    wherein a positioning mechanism moves an arrangement comprising the dispensing mechanism and the application roll relative to the substrate part back and forth along a straight line arranged parallel to the base surface to allow the formation of more than one layer of the first material and/or more than one layer of the second material.

2. The device according to claim 1, further comprising an additional leveling tool positioned after the material application mechanism and before the second fixation device, wherein the additional leveling tool is positionable to be brought into contact with a surface of the at least one second material layer applied to, the topmost solidified material layer in such a manner that the surface of the second material layer is arranged at a constant distance from the base surface.

3. The device according to claim 1, wherein the first leveling tool is a smoothing roll which is mounted to rotate relative to the substrate part about an axis of rotation disposed parallel to the base surface.

4. The device according to claim 1, wherein the inkjet print head is one of a plurality of inkjet print heads from which a predetermined amount of the first material is dispensed as a function of a logic signal received by the dispensing mechanism.

5. The device according to claim 4, wherein the dispensing mechanism has at least one row of the inkjet print heads arranged next to one another, and the row extends parallel to the base surface and transverse to the direction in which the dispensing mechanism and the substrate part move relative to one another.

6. The device according to claim 1, wherein the transfer body is structured as an application roll which is driven to rotate about an axis of rotation disposed parallel to the base surface.

7. The device according to claim 6, wherein the application roll is structured as a rotation screen-printing roll.

8. The device according to claim 6, wherein the positioning mechanism moves the arrangement comprising the dispensing mechanism and the application roll relative to the substrate part away from one another and toward one another, normal to the base surface.

9. The device according to claim 1, wherein the second material, in the solidified state, has a greater mechanical strength than the first material and/or the second material has different mechanical, electrical, or chemical properties from the first material.

10. The device according to claim 1, wherein the second material is electrically, optically, and/or magnetically conductive, and the first material is electrically, optically, and/or magnetically insulating.

11. A method for producing a three-dimensional shaped object by means of layer-by-layer material application, comprising:
    providing a device according to claim 3;
    forming a first material layer of the first material on the base surface, wherein forming of the first material layer comprises:
    dispensing the first material from the dispensing mechanism onto the base surface, so as to produce a first material layer of the three-dimensional shaped object,
    leveling the first material layer with the leveling tool;
    fixing the first material layer with the first fixation device;
    forming a second material layer of the flowable second material on a surface of the first material layer, wherein forming of the second material layer comprises:
    coating a surface region of the transfer body of the material application mechanism with a layer of the second material;
    bringing the layer of second material into contact with the first material layer;
    transferring the layer of second material from the transfer body to the surface of the first material layer to form a second material layer, the structure of which corresponds, at least in certain regions, to that of the first material layer;
    fixing the second material layer with the second fixation device; and
    optionally, moving the substrate part and forming at least one secondary first material layer on the second material layer optionally followed by forming at least one secondary second material layer on the at least one secondary first material layer.

12. The method according to claim 11, further comprising:
    forming a secondary first material layer on the second material layer, such that at least one passage hole is provided in the secondary first layer; and
    applying a secondary second material layer,
    wherein at least one cross-sectional dimension of the passage hole is adapted:
    a) to a pressure with which the secondary second material layer is applied to the secondary first material layer having the passage hole,
    b) to a material thickness of the secondary second layer, and/or
    c) to a viscosity of the second material,
    in such a manner that the passage hole is filled with the second material, and the second material of the secondary second material layer comes into contact with the second material layer.

* * * * *

UNITED STATES PATENT AND TRADEMARK OFFICE
CERTIFICATE OF CORRECTION

| | |
|---|---|
| PATENT NO. | : 11,565,461 B2 |
| APPLICATION NO. | : 16/484969 |
| DATED | : January 31, 2023 |
| INVENTOR(S) | : Hans Mathea et al. |

It is certified that error appears in the above-identified patent and that said Letters Patent is hereby corrected as shown below:

On the Title Page

Column 1, Assignees, Line 2, delete "Eggenstein-Leopoldshafe" and insert -- Eggenstein-Leopoldshafen --

Column 2, Abstract, Line 5, before "flowable" insert -- a --

Signed and Sealed this
Twenty-first Day of March, 2023

*Katherine Kelly Vidal*

Katherine Kelly Vidal
*Director of the United States Patent and Trademark Office*